United States Patent
Liu et al.

(10) Patent No.: US 7,778,410 B2
(45) Date of Patent: Aug. 17, 2010

(54) PERSONAL AUDIO LISTENING DEVICE

(75) Inventors: Chun-Hsin Liu, Taipei Hsien (TW);
Chung-Chun Wu, Taipei (TW);
Yu-Chang Hung, Taipei Hsien (TW);
Liang-Yi Liu, Taipei (TW)

(73) Assignee: Lite-On Technology Corp., Taipei (TW)

( * ) Notice: Subject to any disclaimer, the term of this patent is extended or adjusted under 35 U.S.C. 154(b) by 954 days.

(21) Appl. No.: 11/593,079

(22) Filed: Nov. 6, 2006

(65) Prior Publication Data
US 2007/0286409 A1    Dec. 13, 2007

(30) Foreign Application Priority Data
Jun. 9, 2006    (TW) .............................. 95210095 U

(51) Int. Cl.
*H04M 1/00* (2006.01)
*H04M 9/00* (2006.01)
*H04R 25/00* (2006.01)

(52) U.S. Cl. ...................... 379/430; 381/330; 381/381; 455/575.2

(58) Field of Classification Search ................. 379/430; 381/370, 374, 376, 381, 312, 322, 330; 455/575.1, 455/575.2, 575.6, 569.1; 181/128, 129
See application file for complete search history.

(56) References Cited

U.S. PATENT DOCUMENTS

| 2003/0002704 A1* | 1/2003 | Pronk .......................... 381/374 |
| 2006/0291686 A1* | 12/2006 | Hlas et al. ................... 381/381 |
| 2007/0003095 A1* | 1/2007 | Slamka et al. .............. 381/381 |
| 2008/0178435 A1* | 7/2008 | Liu et al. .................... 24/20 R |

FOREIGN PATENT DOCUMENTS

TW    M257589    2/2005

* cited by examiner

*Primary Examiner*—Tuan D Nguyen
(74) *Attorney, Agent, or Firm*—Rosenberg, Klein & Lee

(57) ABSTRACT

A personal audio listening device is adapted to be worn on a user's ear, and includes a housing, a pivotal knob, and an ear hook member. The housing has a surface and a hollow portion, and defines a first axis and a second axis. The pivotal knob is pivotally mounted on the surface of the housing, and includes a pair of parallel resilient walls. The ear hook member includes a hook body and an end portion. The end portion includes a pivot element in the form of a polygonal post. The hook body is configured to be wearable on the user's ear. The ear hook member is fittingly received between the resilient walls by means of the pivot element so as to be mounted on the pivotal knob. The ear hook member is pivotable about the first axis, and is rotatable about the second axis.

11 Claims, 11 Drawing Sheets

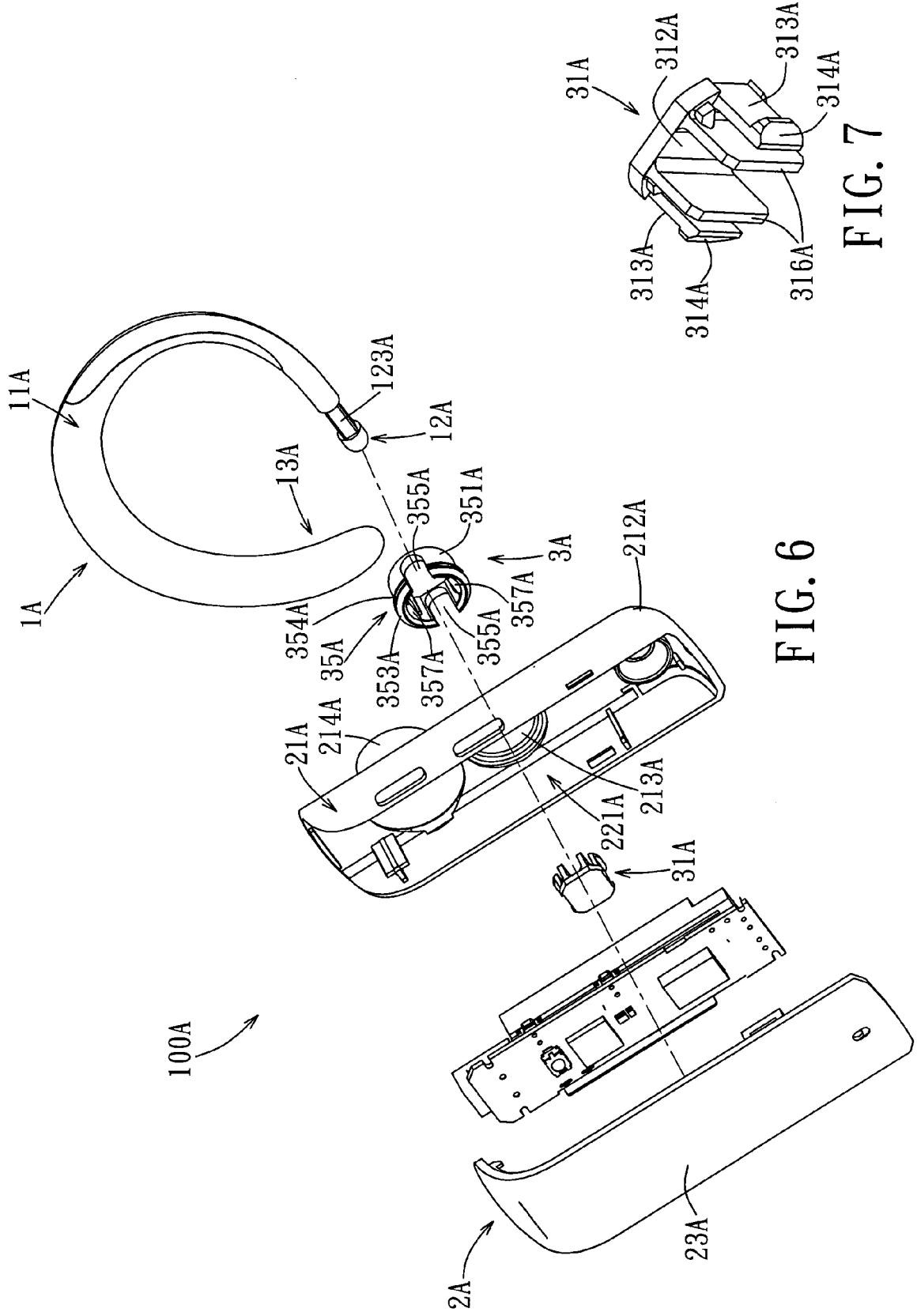

PERSONAL AUDIO LISTENING DEVICE

CROSS-REFERENCE TO RELATED APPLICATION

This application claims priority of Taiwanese Application No. 095210095, filed on Jun. 9, 2006.

BACKGROUND OF THE INVENTION

1. Field of the Invention

The invention relates to a personal audio listening device, more particularly to an earphone for use with a mobile communications device.

2. Description of the Related Art

Mobile phones having Bluetooth functionality and earphones having Bluetooth functionality have been popular for many years. R.O.C. Patent No. M257589 discloses a Bluetooth earphone as shown in FIGS. 1 and 2. The earphone 99 includes a stop plate 6, a housing 7, an ear hook member 8, and a pivotal knob 9. The housing 7 includes a first seat body 71 (adjacent to the user's face in use) and a second seat body (away from the user's face in use; not shown). The first seat body 71 is provided with a circular hole 713 therethrough. The housing 7 has a hollow portion 75 which accommodates a circuit board (not shown) therein for executing functions of a Bluetooth earphone. To facilitate description, the circuit board and the second seat body are neither illustrated in FIGS. 1 and 2 nor discussed in detail herein. The ear hook member 8 has a hook body 81 and a pivoting portion 83 disposed at one end. The hook body 81 is shaped to permit the ear hook member 8 to hook around an ear of the user. The pivoting portion 83 is cylindrical, and is provided with a plurality of axially extending planar faces 831 that are spaced equidistantly apart from each other on a peripheral surface of the pivoting portion 83. The pivotal knob 9 includes a base 91 and a cap 95. The base 91 has a bottom disk 911 and a post 913 extending uprightly from the bottom disk 911. The post 913 is formed with a first through hole 915 parallel to the bottom disk 911. An inner wall surface of the base 91 which defines the first through hole 915 is provided with a plurality of protruding members 917 that can be compressed resiliently and radially. The protruding members 917 correspond to the planar faces 831 of the pivoting portion 83 in number. The bottom disk 911 is provided with a first notch 92 and a second notch 93. The cap 95 is provided with a second through hole 955 corresponding to the first through hole 915. When the cap 95 is disposed on the post 913, the first and second through holes 915, 955 overlap. The stop plate 6 is a planar plate with pads 61 (to be described hereinafter) provided respectively at four corners thereof. The stop plate 6 has two parallel slots 63 formed therein so as to configure the stop plate 6 with a resilient cantilever arm 65. A block 651 is provided at a free end of the cantilever arm 65.

During assembly, the base 91 is extended through the circular hole 713 in the first seat body 71. At this time, the bottom disk 911 is blocked by the first seat body 71, and stays in the hollow portion 75. Then, the cap 95 is fitted on the post 913, with the pivoting portion 83 of the ear hook member 8 passing through the overlapping first and second through holes 915, 955, thereby coupling the ear hook member 8, the housing 7 and the pivotal knob 9. At this time, the stop plate 6 is attached to an inner surface (within the hollow portion 75) of the first seat body 71 using a mechanical fastening method or a chemical bonding method to cover the bottom disk 911. Since the four corners of the stop plate 6 are respectively provided with the pads 61 that have a certain thickness, although the stop plate 6 covers the bottom disk 911, it will not affect pivotal rotation of the pivotal knob 9. When the pivotal knob 9 rotates, the block 651 will interferingly engage one of the first and second notches 92, 93 to thereby achieve positioning. When the ear hook member 8 rotates in the through hole 915, positioning is achieved by means of inter-engagement between the radially compressible protruding members 917 and the planar faces 831 on the pivoting portion 83.

However, in the aforesaid patent, since the radially compressible protruding members 917 are provided on the inner wall surface of the base 91 which defines the first through hole 915, which is a relatively small hole, the construction of the base 91 is complicated. Besides, there is also the problem of difficulty in positioning between the protruding members 917 and the planar faces 831 on the pivoting portion 83. Moreover, in use, the pivoting portion 83 of the ear hook member 8 can be easily pulled out. In addition, manufacture and fastening of the stop plate 6 are labor- and time-consuming.

SUMMARY OF THE INVENTION

Therefore, an object of the present invention is to provide a personal audio listening device in which an ear hook member and a housing of the audio listening device are pivotable and rotatable after assembly.

Another object of the present invention is to provide a personal audio listening device, in which an ear hook member rotates by steps, and a click can be felt when the ear hook member is rotated through a step.

Still another object of the present invention is to provide a personal audio listening device, which has an engaging mechanism to prevent separation of an ear hook member from a housing during use.

Yet another object of the present invention is to provide a personal audio listening device, in which an ear hook member and a housing can be easily assembled to thereby achieve labor and cost savings.

Accordingly, the personal audio listening device of the present invention includes a pivotal knob provided with a pair of pivotable parallel resilient walls, and an ear hook member having an end portion with a non-circular cross section. The resilient walls are provided to clamp the end portion with the non-circular cross section so as to enable the ear hook member to pivot about a first axis and to rotate about a second axis.

The personal audio listening device of the present invention is a Bluetooth earphone which can be worn on a user's ear. The first axis is substantially perpendicular to a plane defined by the profile of the user's ear, and the second axis is substantially parallel to the plane.

The ear hook member of a first preferred embodiment of the personal audio listening device according to the present invention is substantially C-shaped, and has a hook body that is configured to be worn on the user's ear, and an upper end portion. The upper end portion is formed with a pivot element in the form of a polygonal post of a certain length proximate to a distal end thereof. The housing includes a housing body and a housing cover, and is formed with a hollow portion. The housing body has a through hole in spatial communication with the hollow portion. The pivotal knob includes a base and a cap. The base has two engaging walls disposed respectively at an outer periphery thereof. Each engaging wall has a free end formed with a hook. Two parallel resilient walls are disposed between the engaging walls. When the pivot element is received between the resilient walls, the resilient walls can respectively contact opposing surfaces of the pivot element, and exert a restraining clamping force on the pivot element. The cap has a circular surrounding wall, and has an outer wall surface provided with two spaced-apart and parallel flanges, each having a diameter larger than an inner diameter of the through hole in the housing body. The cap is formed with two slots that can engage two ends of the pivot element of the ear hook member without obstructing rotation of the ear hook member. Ribs are provided on an inner wall surface of the surrounding wall of the cap to correspond to the engaging walls. The base is extended through the through hole from the hollow portion, and the pivot element is received between the resilient walls such that lengthwise opposing ends of the resilient walls abut against lengthwise opposing ends of the pivot element to prevent removal of the ear hook member. A lower one of the two flanges of the cap extends into the hollow portion through the through hole to couple rotatably the cap to the housing body. The hooks at the free ends of the engaging walls respectively engage the ribs on the inner wall surface of the surrounding wall of the cap so as to couple the base and the cap, thereby accomplishing assembly of the ear hook member, the housing, and the pivotal knob.

The ear hook member of another preferred embodiment of a personal audio listening device according to the present invention is substantially C-shaped, and has a hook body that is configured to be worn on the user's ear, and an upper end portion. The upper end portion is formed with a pivot element in the form of a polygonal post of a certain length proximate to a distal end thereof. The housing includes a housing body and a housing cover, and is formed with a hollow portion. The housing body has a through hole in spatial communication with the hollow portion. The pivotal knob includes a base and a cap. The base has two engaging walls disposed respectively at an outer periphery thereof. Each engaging wall has a free end formed with a hook. Two parallel resilient walls are disposed between the engaging walls. When the pivot element is received between the resilient walls, the resilient walls can respectively contact opposing surfaces of the pivot element, and exert a restraining clamping force on the pivot element. The cap has an annular bottom wall and a circular surrounding wall extending integrally and upwardly from the bottom wall. When the cap is extended from the hollow portion outwardly through the through hole, the bottom wall is blocked by the housing body, and the cap and the housing body are rotatably coupled together. A pair of fitting holes are provided in the surrounding wall for extension of the upper end portion of the ear hook member therethrough. Ribs are provided on an inner wall surface of the surrounding wall of the cap to correspond to the engaging walls. The surrounding wall of the cap is first extended outward from the hollow portion through the through hole in the housing body, and the upper end portion of the ear hook member is brought to pass through the two fitting holes, whereby the cap and the housing body can be rotatably coupled together. Then, the base is inserted into the cap, and the pivot element is received between the two resilient walls such that lengthwise opposing ends of the resilient walls abut against lengthwise opposing ends of the pivot element to prevent removal of the ear hook member. The hooks of the base respectively engage the ribs on the inner wall surface of the surrounding wall of the cap to thereby couple the base and the cap, thereby accomplishing assembly of the ear hook member, the housing, and the pivotal knob.

The ear hook member of a further preferred embodiment of a personal audio listening device according to the present invention is substantially C-shaped, and has a hook body that is configured to be worn on the user's ear, and an upper end portion. A pivot element in the form of a polygonal post of a certain length is formed at a distal end of the upper end portion. A neck portion is interposed between the pivot element and the hook body. The housing includes a housing body and a housing cover. The housing body has a circular through hole in spatial communicated with a hollow portion. The pivotal knob includes a circular base and a circular cap. The circular base is provided with a surrounding wall. A heat-fusible portion formed from a heat-fusible plastic material is disposed under the base and is extended through the through hole. Two parallel resilient walls extend uprightly from the base. When the pivot element is received between the two resilient walls, the two resilient walls respectively contact opposing surfaces of the pivot element, and exert a restraining clamping force on the pivot element opposing ends of one of the resilient walls are configured to bend toward opposing ends of the other one of the resilient walls so to embrace the pivot element and help prevent removal of the ear hook member. The surrounding wall of the base is formed with a single slot and at least two shoulder portions. The cap has a surrounding wall, and is provided with hook portions corresponding to the shoulder portions. The cap is further provided with a slot corresponding to the slot in the circular base. The heat-fusible portion of the circular base is extended into the hollow portion through the through hole, and heat is applied to the heat-fusible portion to form the same into a base disk such that the circular base can rotate relative to the housing. Then, the pivot element is fitted between the resilient walls. Then, the cap is put in place, with the slots engaging an end of the neck portion of the ear hook member distal from the pivot element such that the ear hook member cannot be plugged out. The hook portions on the surrounding wall of the cap respectively engage the shoulder portions on the surrounding wall of the circular base to couple the circular base and the circular cap, thereby accomplishing assembly of the ear hook member, the housing, and the pivotal knob.

The pivot element in the preferred embodiments is a post with a square cross section.

In two preferred embodiments of the present invention, the pivot element is the neck portion of the ear hook member, and the length thereof is not smaller than that of the resilient walls. The resilient walls each have two ends that respectively abut against corresponding ends of the pivot element to prevent removal of the ear hook member.

In the other preferred embodiment, a neck portion is provided between the pivot element and the ear hook member, and the surrounding wall of the base and/or the cap can abut against the neck portion to prevent removal of the ear hook member.

In the preferred embodiments of the present invention, the pivot element of the ear hook member rotates between the two resilient walls. When the pivot element rotates through a step, during the process of rotation, the two resilient walls will be gradually pushed outward away from each other such that the two resilient walls are at a widest stretched position when two diametrically opposite corners of the pivot element respectively abut against the resilient walls. After one step of rotation, the stretched resilient walls will return to their original positions and snap against the corresponding surfaces of the pivot element so that the user can feel a click. If the pivot element is further rotated, the user can feel successive clicks.

BRIEF DESCRIPTION OF THE DRAWINGS

Other features and advantages of the present invention will become apparent in the following detailed description of the preferred embodiments with reference to the accompanying drawings, of which:

FIG. 6 is an exploded perspective view to illustrate an ear hook member, a housing, and a pivotal knob of the first preferred embodiment;

FIG. 7 is a perspective view to illustrate a base of the pivotal knob of the first preferred embodiment;

DETAILED DESCRIPTION OF THE PREFERRED EMBODIMENTS

Figure 1:
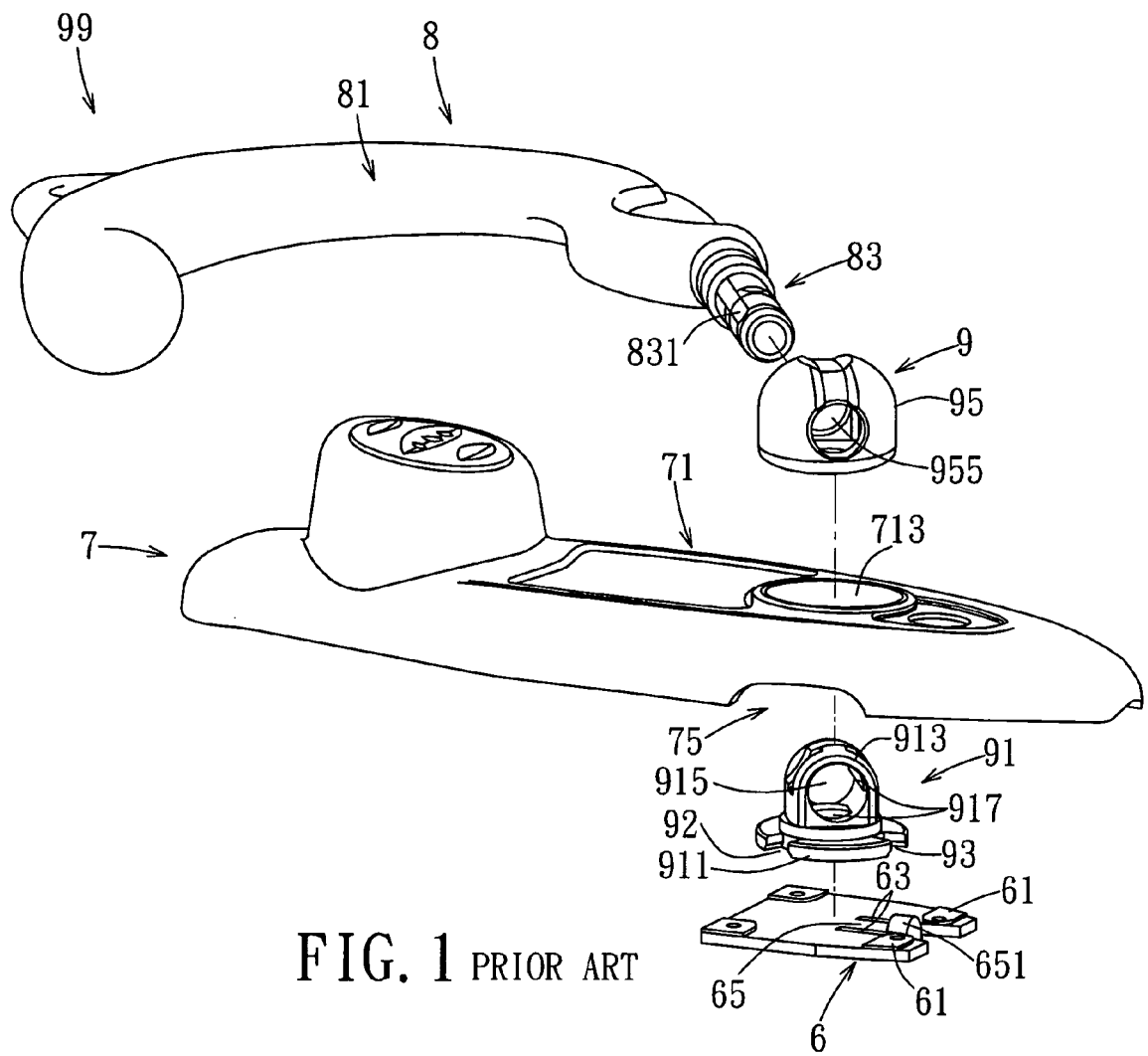
FIG. 1 is an exploded perspective view to illustrate a stop plate, a housing, a near hook member, and a pivotal knob of a conventional Bluetooth earphone.
Figure 2:
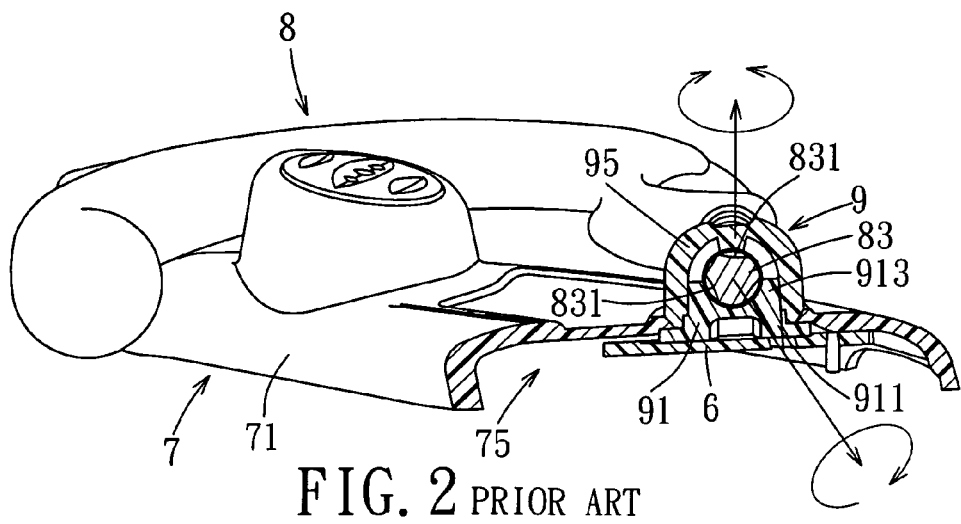
FIG. 2 is a partly sectional perspective view to illustrate the assembling relationships of the components of the earphone of FIG. 1.
Figure 3:
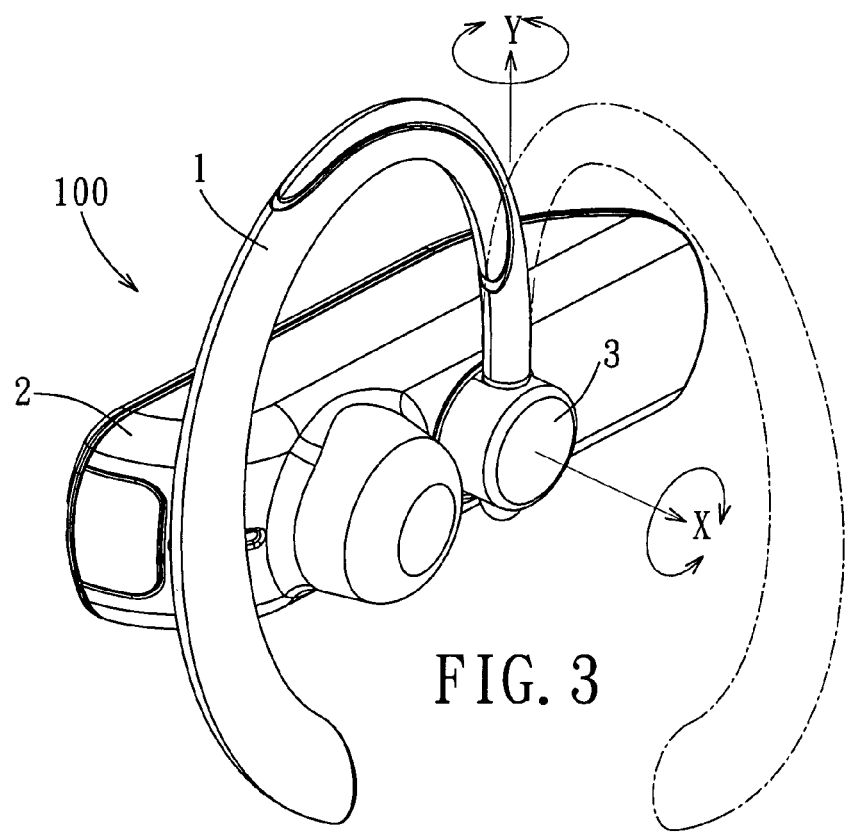
FIG. 3 is an assembled perspective view to illustrate the personal audio listening device according to the present invention, showing first and second axes.
Figure 4:
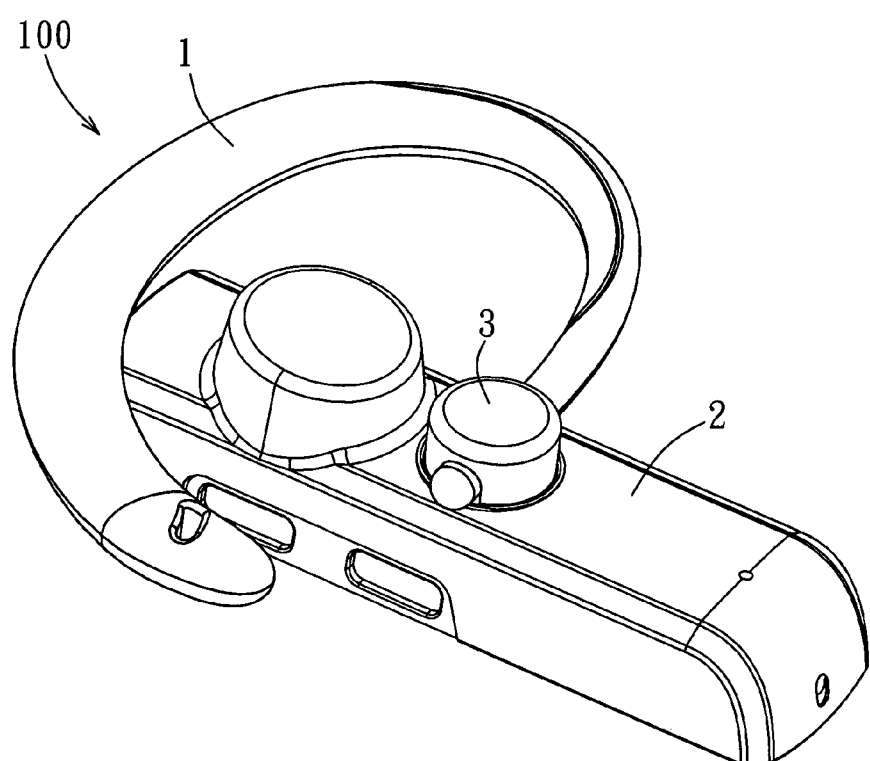
FIG. 4 is an assembled perspective view of the personal audio listening device according to the present invention taken from another angle.
Figure 5:
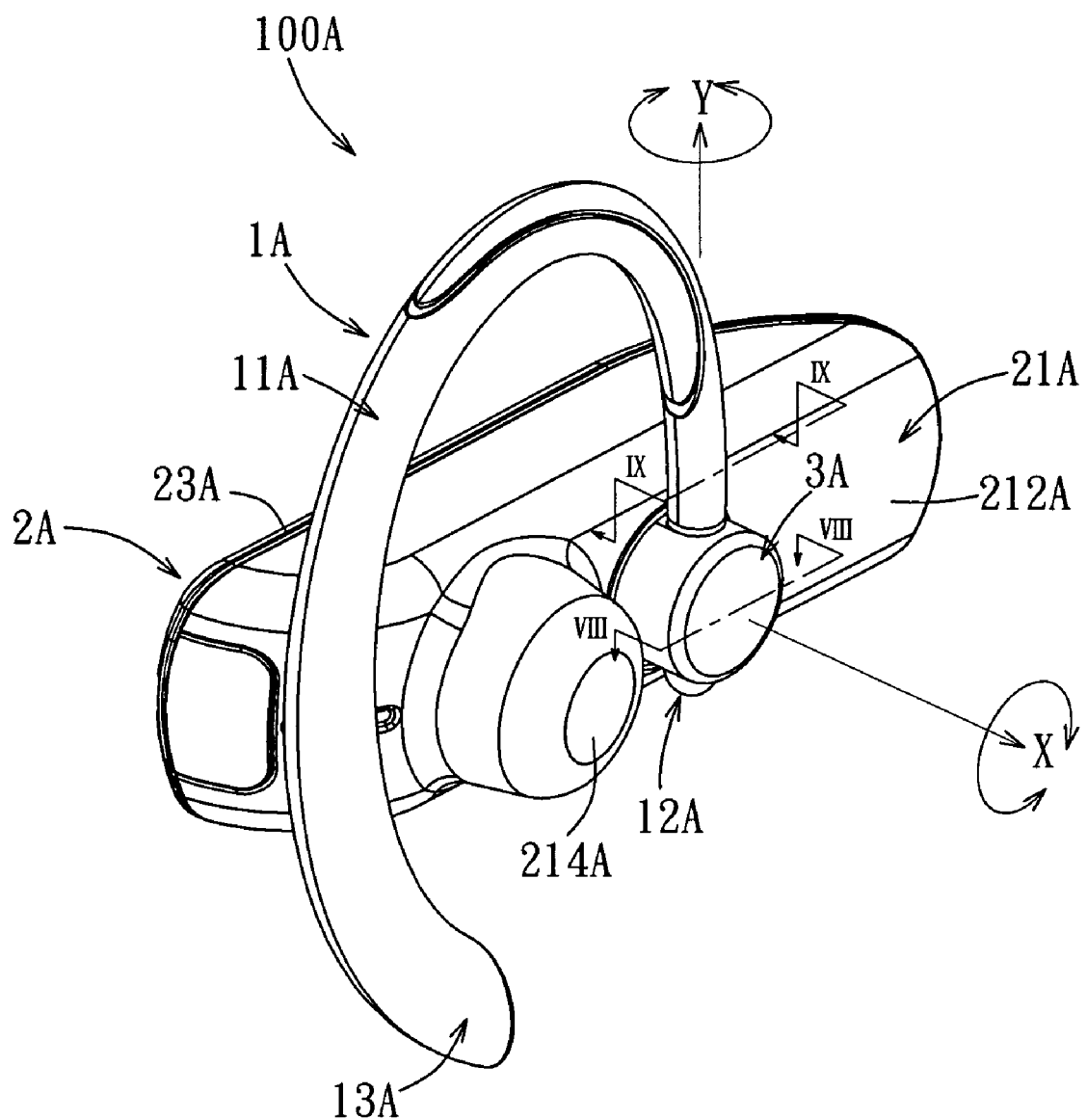
FIG. 5 is an assembled perspective view to illustrate the first preferred embodiment of a personal audio listening device according to the present invention.
Figure 8:
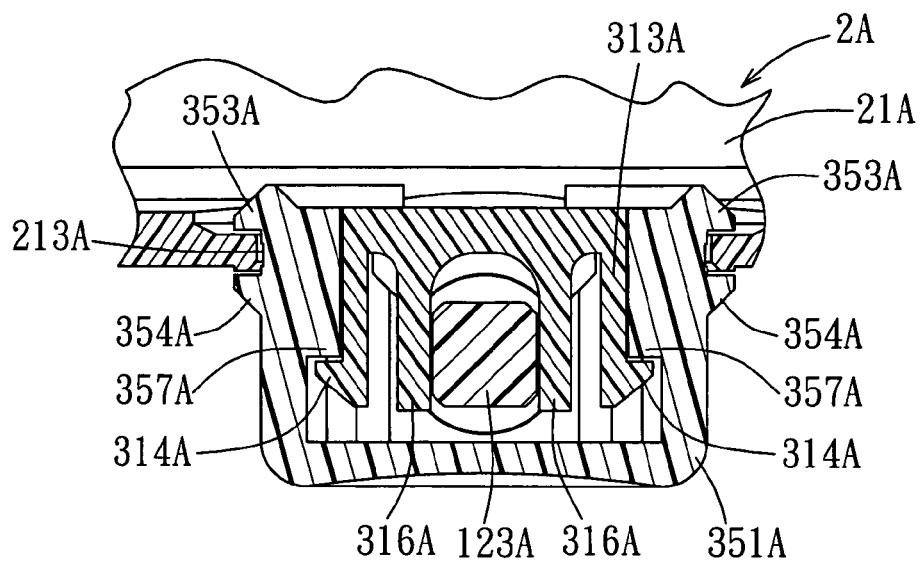
FIG. 8 is a sectional view taken along line VIII-VIII of FIG. 5, showing the assembly relationships among the base, a cap of the pivotal knob, and the housing of the first preferred embodiment.
Figure 9:
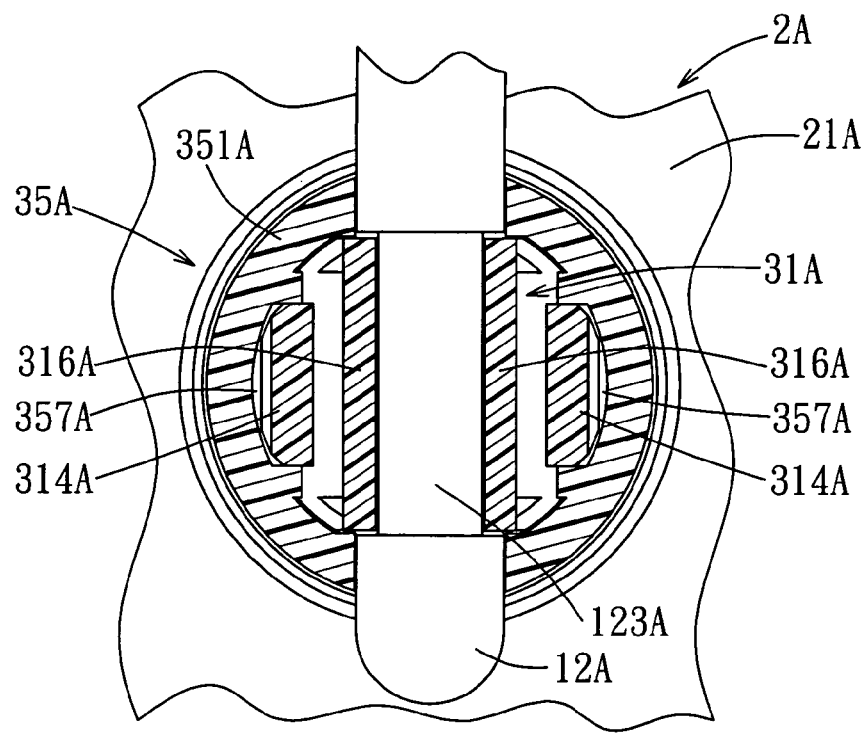
FIG. 9 is a sectional view taken along line IX-IX of FIG. 5, illustrating the assembly relationship between a pivot element and resilient walls of the first preferred embodiment.
Figure 10:
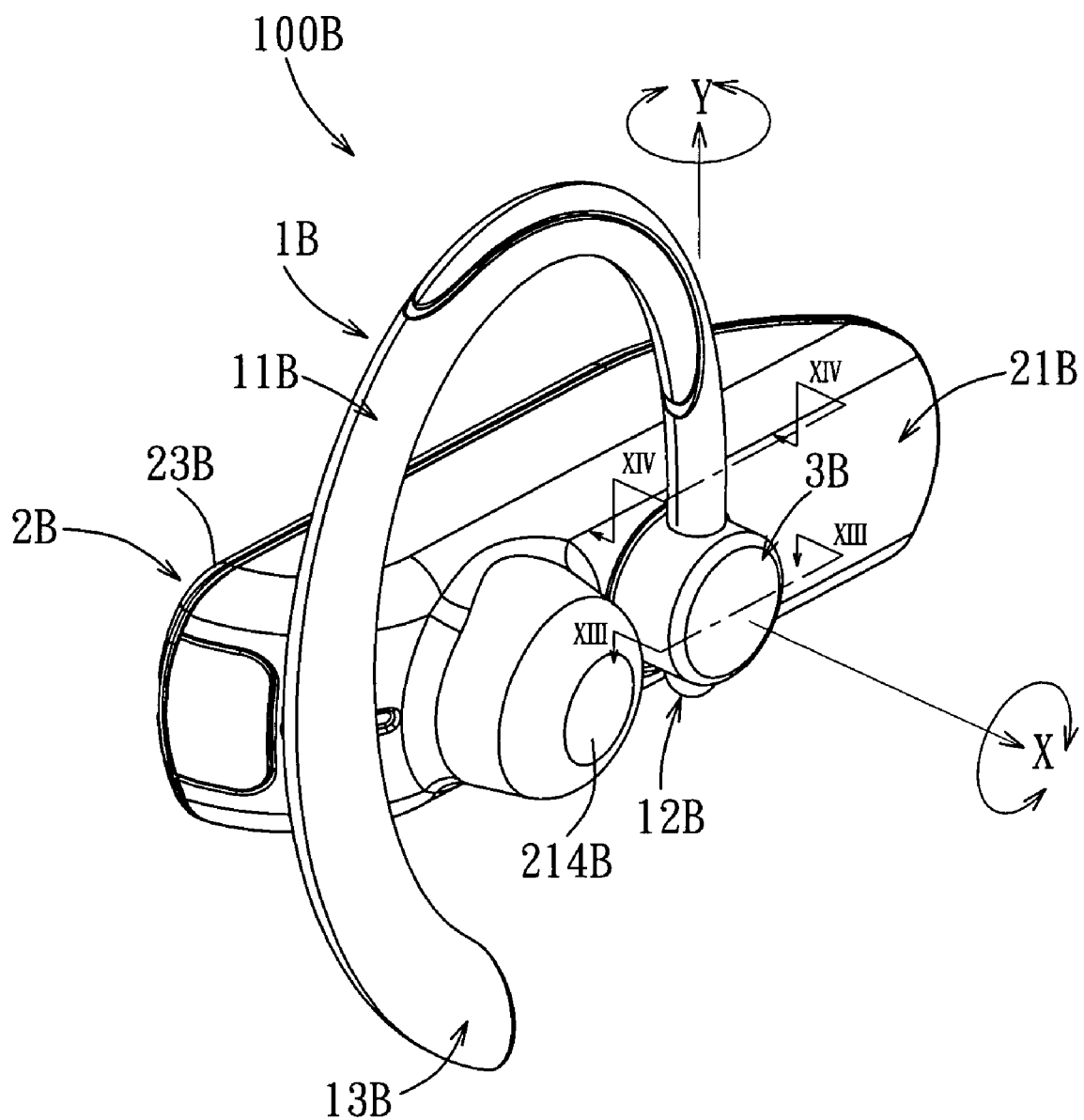
FIG. 10 is an assembled perspective view to illustrate the second preferred embodiment of a personal audio listening device according to the present invention.
Figure 12:
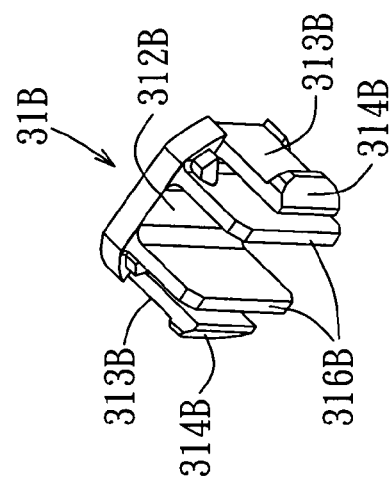
FIG. 12 is a perspective view of a base of the pivotal knob of the second preferred embodiment.
Figure 11:
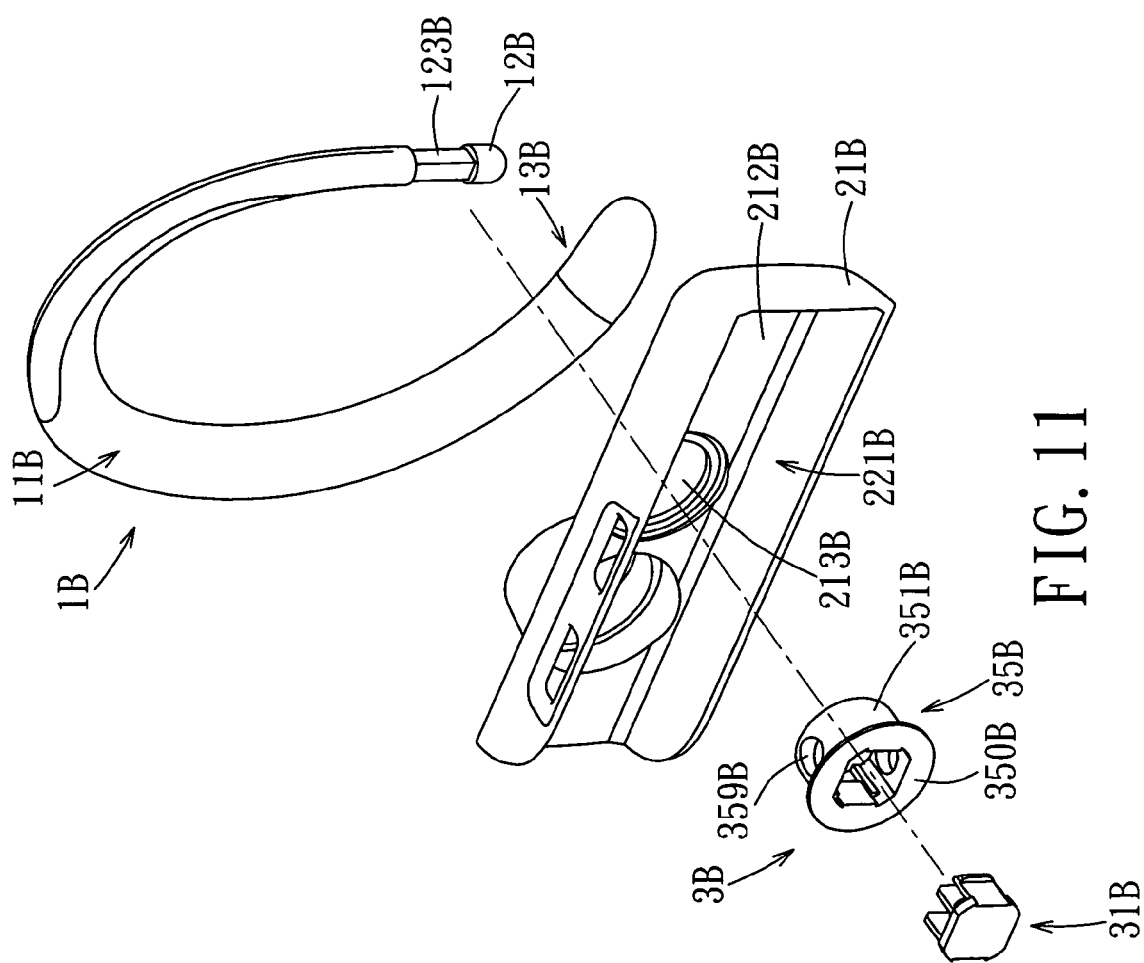
FIG. 11 is an exploded perspective view to illustrate an ear hook member, a housing, and a pivotal knob of the second preferred embodiment.
Figure 13:
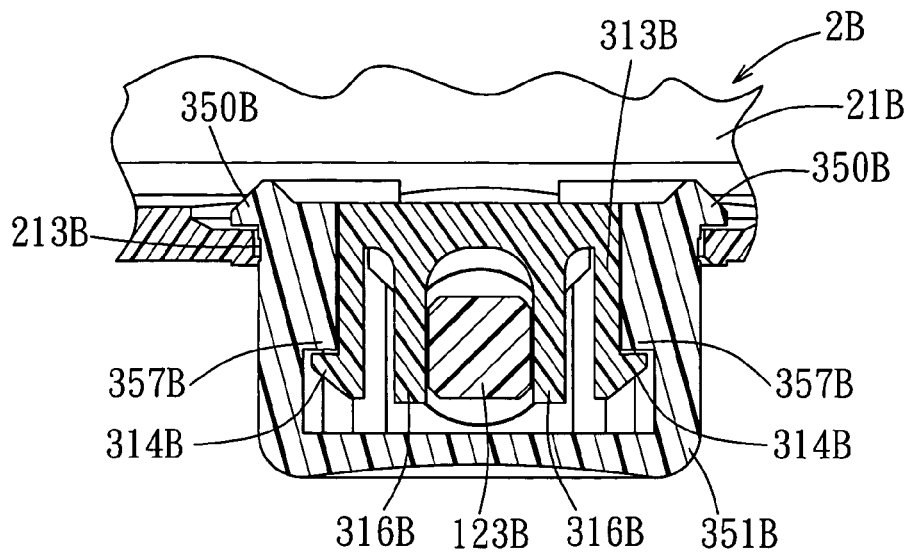
FIG. 13 is a sectional view taken along line XIII-XIII of FIG. 10, illustrating the assembly relationships among the base, a cap of the pivotal knob, and the housing of the second preferred embodiment.
Figure 14:
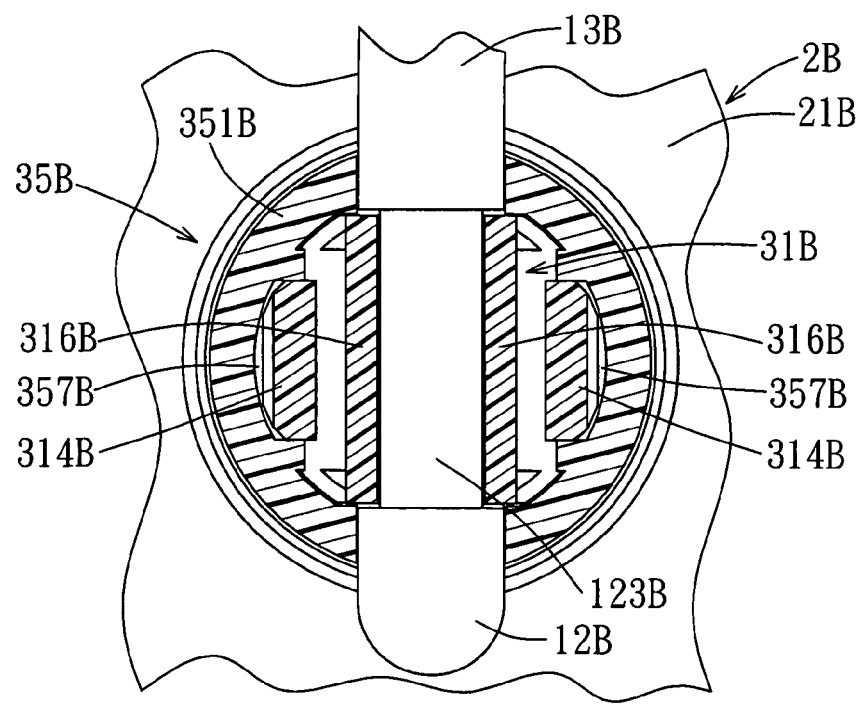
FIG. 14 is a sectional view taken along line XIV-XIV of FIG. 10, illustrating the assembly relationship between a pivot element and resilient walls of the second preferred embodiment.
Figure 15:
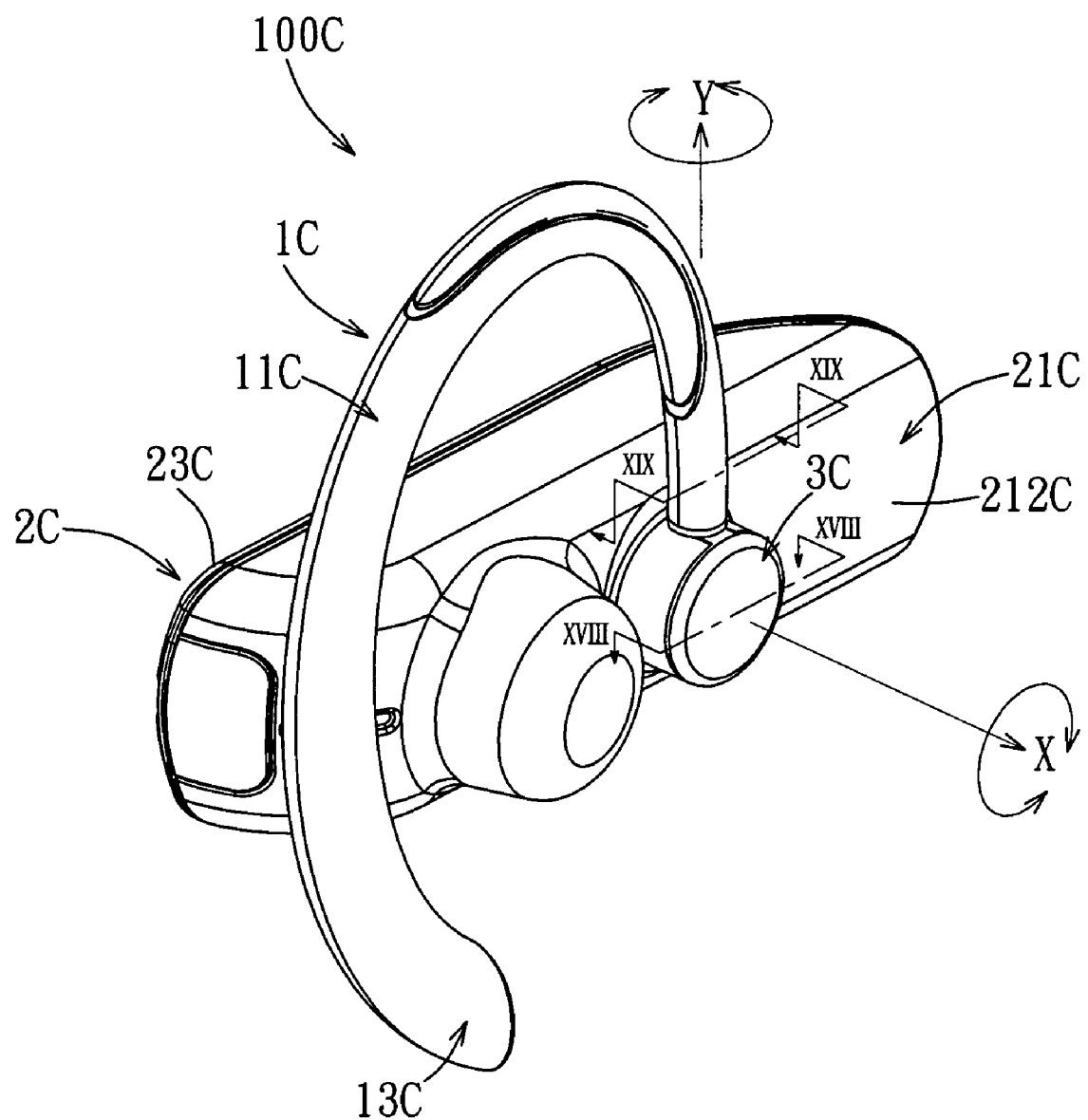
FIG. 15 is an assembled perspective view to illustrate the third preferred embodiment of a personal audio listening device according to the present invention.
Figure 16:
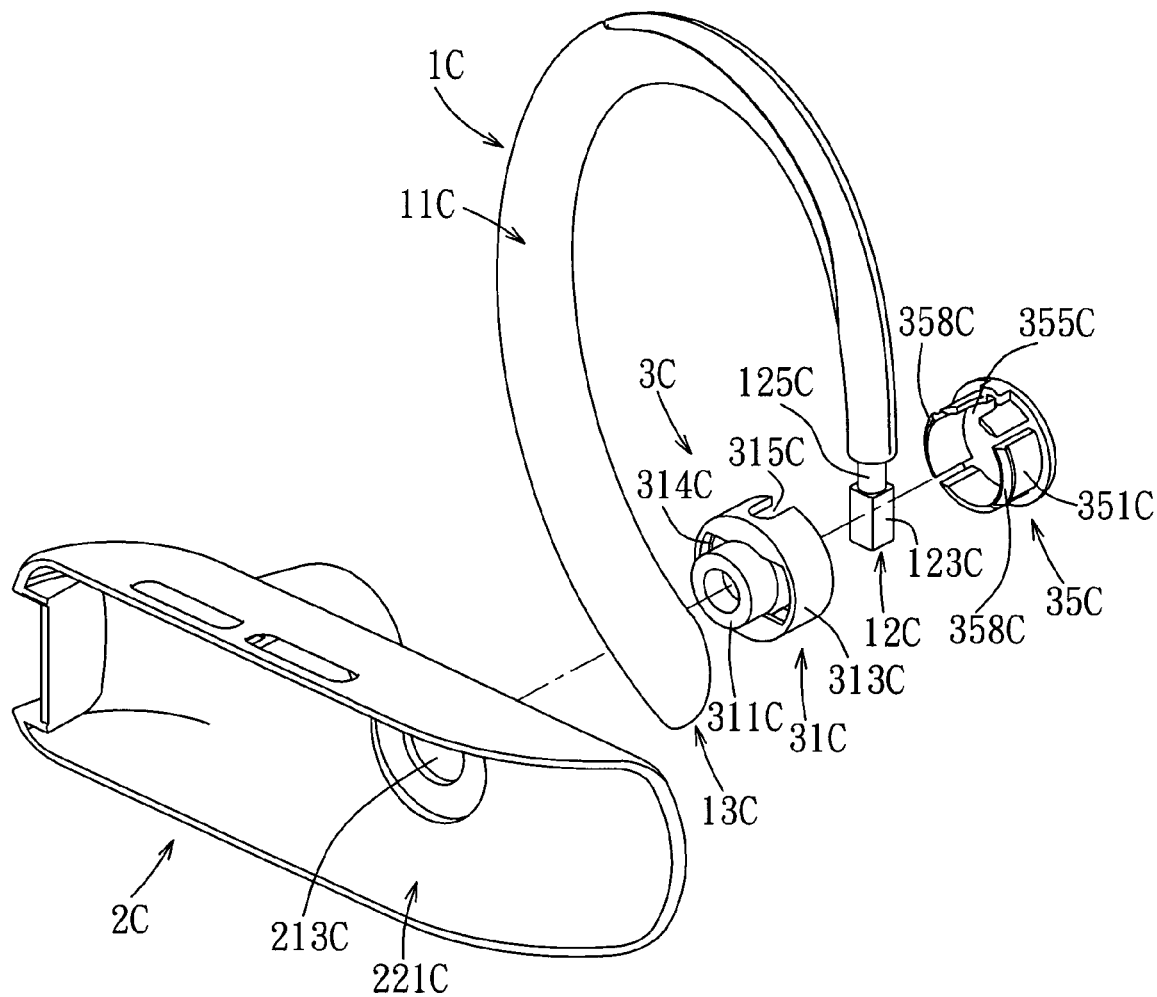
FIG. 16 is an exploded perspective view to illustrate an ear hook member, a housing, and a pivotal knob of the third preferred embodiment.
Figure 17:
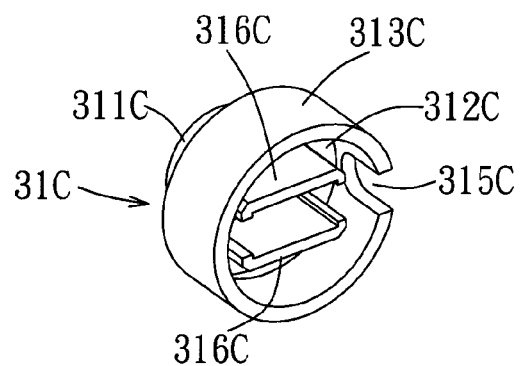
FIG. 17 is a perspective view of a base of the pivotal knob of the third preferred embodiment.
Figure 18:
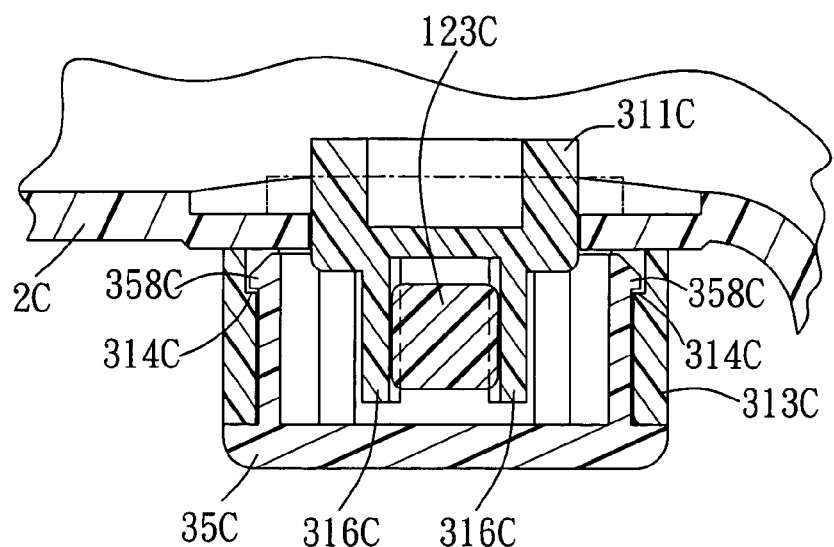
FIG. 18 is a sectional view taken along line XVIII-XVIII of FIG. 15, illustrating the assembly relationships among the base, a cap of the pivotal knob, and the housing of the third preferred embodiment.
Figure 19:
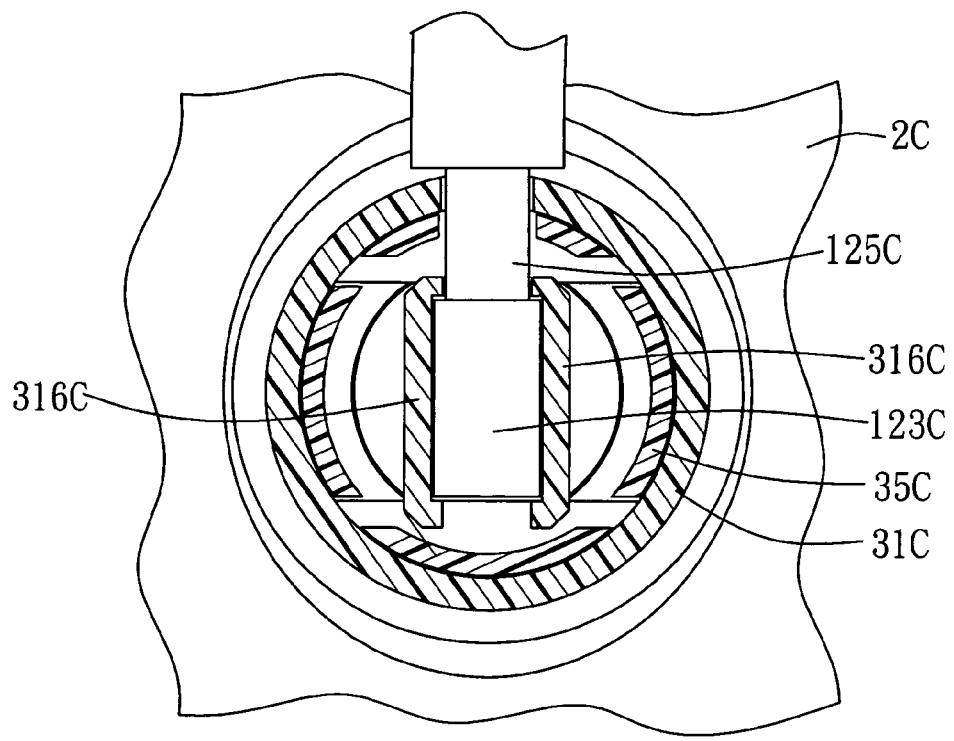
FIG. 19 is a sectional view taken along line XIX-XIX of FIG. 15, illustrating the assembly relationship between a pivot element and resilient walls of the third preferred embodiment.

With reference to FIGS. 3 and 4, a personal audio listening device 100, e.g., an earphone, a hearing aid, etc., of the present invention is shown to include an ear hook member 1, a housing 2, and a pivotal knob 3. The ear hook member 1 is pivotable about a first axis (X), and is rotatable about a second axis (Y). In the following embodiments, the first axis (X) and the second axis (Y) are substantially perpendicular to each other. The first axis (X) is substantially perpendicular to a plane defined by the profile of a user's ear, whereas the second axis (Y) is substantially parallel to the plane. Hereinbelow, an earphone having Bluetooth functionality (commonly referred to as a Bluetooth earphone) is used as an example to illustrate the present invention.

Referring to FIGS. 5 to 9, the first preferred embodiment of a personal audio listening device 100A of this invention is shown to include an ear hook member 1A, a housing 2A, and a pivotal knob 3A. The ear hook member 1A is substantially C-shaped, and has a hook body 11A that is configured to be worn on the user's ear, an upper end portion 12A, and a lower end portion 13A. The upper end portion 12A is in the form of a rod, and extends in an axial direction that coincides with the direction of the second axis (Y). The upper end portion 12A is formed with a neck portion 123A of a certain length proximate to a distal end thereof. Assuming that the axial direction of the upper end portion 12A is the lengthwise direction, the size of the neck portion 123A in the widthwise direction and the height wise direction is smaller than the size of the other parts of the upper end portion 12A. The neck portion 123A is a polygonal post, and is preferably a post with an even number of sides. In this embodiment, the neck portion 123A has a square cross-section. The neck portion 123A serves as a pivot element in this embodiment, and will be referred to as the pivot element 123A in the description to follow.

The housing 2A includes a housing body 21A and a housing cover 23A. The housing body 21A has a surface 212A (disposed proximate to the user's face in use), which is formed with a circular through hole 213A. In this embodiment, the housing body 21A and the housing cover 23A can be detachably assembled using a known method. The housing body 21A and the housing cover 23A cooperatively define a hollow portion 221A, which accommodates therein a microphone, a speaker, and a circuit device for executing functions of a Bluetooth earphone. The surface 212A of the housing body 21A is also provided with a protruding member 214A that resembles an ear plug, which can be plugged into the ear to transmit sounds. Since the microphone, the speaker, and the circuit device are known in the art and are not crucial features of the present invention, they will not be described in detail herein. In addition, for clarity's sake, the microphone, the speaker and the circuit device are not illustrated in FIGS. 8 and 9, and the housing cover 23A is omitted from FIGS. 8 and 9.

The pivotal knob 3A includes a base 31A and a cap 35A. The base 31A has a base surface 312A, and four walls extending uprightly from the base surface 312A. The four walls include two engaging walls 313A disposed respectively on left and right sides of the base surface 312A at an outer periphery thereof, and two parallel resilient walls 316A disposed between the two engaging walls 313A. Each of the engaging walls 313A has a free end formed with a hook 314A. Each of the resilient walls 316A has a length not greater than, and preferably slightly smaller than, that of the pivot element 123A. A distance between the two resilient walls 316A is not smaller than the height or width of the pivot element 123A. Preferably, when the pivot element 123A is received between the two resilient walls 316A, the two resilient walls 316A respectively contact opposing surfaces of the pivot element 123A, and exert a restraining clamping force on the pivot element 123A. The cap 35A resembles a hat with a round top, and has a circular surrounding wall 351A. The surrounding wall 351A is provided with two flanges 353A, 354A that extend along an outer wall surface thereof adjacent to a bottom edge thereof, and that are spaced apart from each other in a parallel relationship. The diameter of each of the lower flange 353A and the upper flange 354A is larger than the inner diameter of the circular through hole 213A in the housing body 21A. The resilient walls 316A define a passage therebetween. The cap 35A is formed with two opposite slots 355A that are registered with the passage and that are defined by inverted U-shaped slot walls. The slots 355A are dimensioned to engage two ends of the pivot element 123A of the ear hook member 1 fittingly while ensuring rotation of the ear hook member 1A is not obstructed. Besides, due to the provision of the slots 355A, the flanges 353A, 354A on the cap 35A can engage a wall part that defines the circular through hole 213A in the housing body 21A, which will be described in detail hereinbelow. The surrounding wall 351A is further provided with two ribs 357A (see FIG. 8) that are disposed diametrically opposite to each other on an inner wall surface thereof to correspond to the engaging walls 313A and that have upper surfaces parallel to the top of the cap 35A. When assembling the base 31A and the cap 35A, the base 31A is inserted into the cap 35A such that the hooks 314A at the free ends of the engaging walls 313A respectively engage the ribs 357A on the inner wall surface of the cap 35A, thereby coupling the base 31A and the cap 35A.

In this embodiment, when assembling the ear hook member 1A, the housing 2A, and the pivotal knob 3A, the base 31A of the pivotal knob 3A is extended through the through hole 213A in the surface of the housing body 21A from the hollow portion 221A, and the pivot element 123A of the ear hook member 1A is received between the two resilient walls 316A. Since the length of the resilient walls 316A is slightly smaller than that of the pivot element 123A, lengthwise opposing ends of the resilient walls 316A will abut against lengthwise opposing ends of the pivot element 123A to prevent removal of the ear hook member 1A. Then, the cap 35A is put in place in the following manner. Since the slots 355A allow the surrounding wall 351A of the cap 35A to be slightly deformable, especially at the bottom edge, the lower flange 353A of the cap 35A can be squeezed into the hollow portion 221A through the through hole 213A in the surface of the housing body 21A such that the wall part defining the through hole 213A is between the flanges 353A, 354A. Thus, the cap 35A and the housing body 21A are rotatably coupled. At the same time, the slots 355A engage the two ends of the pivot element 123A of the ear hook member 1A, and the hooks 314A at the free ends of the engaging walls 313A of the base 31A respectively engage the ribs 357A on the inner wall surface of the cap 35A to thereby couple the base 31A and the cap 35A, thereby accomplishing assembly of the ear hook member 1A, the housing 2A, and the pivotal knob 3A.

After the ear hook member 1A, the housing 2A and the pivotal knob 3A are coupled, the ear hook member 1A can, as shown in FIG. 3, pivot about the first axis (X) and rotate about the second axis (Y). When the personal audio listening device 100A of this invention is worn on the user's ear, the ear hook member 1A which is pivotable about the first axis (X) and which is rotatable about the second axis (Y) permits adjustment of the position of a front end of the housing 2A, as well as the position of the microphone (not shown), so as to enable the microphone to be moved closer to the user's mouth. Furthermore, the ear hook member 1A which is rotatable about the second axis (Y) allows the personal audio listening device 100A of the present invention to be worn either on the left ear or the right ear of the user. In addition, when the ear hook member 1A is rotated about the second axis (Y), as illustrated in the first embodiment, the pivot element 123A of the ear hook member 1A is rotatable between the two resilient walls 316A, and the pivot element 123A (which has a square cross section) rotates in steps of 90 degrees. When the pivot element 123A is rotated, the resilient walls 316A are gradually pushed away from each other. When the pivot element 123A is rotated through 45 degrees, the two resilient walls 316A are at a largest stretched position. After the pivot element 123A has completed one step of rotation, the stretched resilient walls 316A will be restored to their original positions, and will snap against the opposing surfaces of the pivot element 123A, whereupon the user will feel a click that lets the user know that the pivot element 123A has been rotated through a step. Subsequent rotation of the pivot element 123A will cause the pivot element 123A to go through further steps in the aforementioned manner.

Referring to FIGS. 10 to 14, the second preferred embodiment of a personal audio listening device 100B according to the present invention is shown to include an ear hook member 1B, a housing 2B, and a pivotal knob 3B. The second preferred embodiment differs from the first preferred embodiment in the pivotal knob 3B.

The ear hook member 1B is substantially C-shaped, and has a hook body 11B that is configured to be worn on the user's ear, an upper end portion 12B, and a lower end portion 13B. The upper end portion 12B is in the form of a rod, and is formed with a neck portion 123B of a certain length proximate to a distal end thereof. The neck portion 123B is a polygonal post, and is preferably a polygonal post with an even number of sides. In this embodiment, the neck portion 123B is a post with a square cross section. As the neck portion 123B serves as a pivot element in the embodiment, it will be referred to as the pivot element 123B in the succeeding paragraphs.

The housing 2B includes a housing body 21B and a housing cover 23B. The housing body 21B has a surface 212B, which is provided with a circular through hole 213B. In this embodiment, the housing body 21B and the housing cover 23B can be detachably assembled in a known manner. The housing body 21B and the housing cover 23B cooperatively define a hollow portion 221B. For clarity's sake, in FIGS. 11, 13, and 14, the microphone, the speaker, and the necessary circuit device of the personal audio listening device 100B are not illustrated, and the housing cover 23B is omitted as well.

The pivotal knob 3B includes a base 31B and a cap 35B. The base 31B has a base surface 312B, and four walls extending uprightly from the base surface 312B. The walls include two engaging walls 313B disposed respectively on left and right sides of the base surface 312B at an outer periphery, and two parallel resilient walls 316B disposed between the two engaging walls 313B. Each of the engaging walls 313B has a free end formed with a hook 314B. Each of the resilient walls 316B has a length not greater than, and preferably slightly smaller than, that of the pivot element 123B. A distance between the two resilient walls 316B is not smaller than the height or width of the pivot element 123B. Preferably, when the pivot element 123B is received between the two resilient walls 316B, the two resilient walls 316B respectively contact opposing surfaces of the pivot element 123B, and exert a restraining clamping force on the pivot element 123B. The cap 35B resembles a hat with a round top, and has an annular bottom wall 350B and a circular surrounding wall 351B extending integrally and upwardly from the bottom wall 350B. The outer diameter of the bottom wall 350B is greater than the diameter of the through hole 213B. The inner diameter of the surrounding wall 351B is smaller than the diameter of the through hole 213B such that when the cap 35B is extended from the hollow portion 221B outwardly through the through hole 213B, the bottom wall 350B is blocked by the surface 212B of the housing body 21B, with only the surrounding wall 351B exposed on the outside. At this time, the cap 35B and the housing body 21B are rotatably coupled together. A pair of fitting holes 359B are provided in the surrounding wall 351B for extension of the upper end portion 12B of the ear hook member 1B therethrough (to be described hereinafter). The surrounding wall 351B is further provided with two ribs 357B (see FIG. 13) that are disposed diametrically opposite to each other on an inner wall surface thereof to correspond to the engaging walls 313B and that have upper surfaces parallel to the top of the cap 35B. When assembling the base 31B and the cap 35B, the base 31B is inserted into the cap 35B such that the hooks 314B at the free ends of the engaging walls 313B respectively engage the ribs 357B on the inner wall surface of the cap 35B, thereby coupling the base 31B and the cap 35B.

In this embodiment, when assembling the ear hook member 1B, the housing 2B, and the pivotal knob 3B, the surrounding wall 351B of the cap 35B is first extended outward from the hollow portion 221B of the housing body 21B through the through hole 213B. Then, the upper end portion 12B of the ear hook member 1B is brought to pass through the two fitting holes 359B. At this time, the pivot element 123B is located in the cap 35B. By means of the ear hook member 1B that extends through the two fitting holes 359B in the cap 35B, the cap 35B and the housing body 21B can be rotatably coupled together, and the cap 35B is prevented from slipping from the housing body 21B. Subsequently, the base 31B is inserted into the cap 35B, and the pivot element 123B is received between the two resilient walls 316B. Since the length of the resilient walls 316B is slightly smaller than that of the pivot element 123B, lengthwise opposing ends of the resilient walls 316B will abut against lengthwise opposing ends of the pivot element 123B to prevent removal of the ear hook member 1B. The hooks 314B at the free ends of the engaging walls 313B of the base 31B respectively engage the ribs 357B on the inner wall surface of the cap 35B to thereby couple the base 31B and the cap 35B, thereby accomplishing assembly of the ear hook member 1B, the housing 2B, and the pivotal knob 3B.

As in the first preferred embodiment, after assembly of the ear hook member 1B, the housing 2B, and the pivoting element 3B, the ear hook member 1B can pivot about the first axis (X) and rotate about the second axis (Y), as shown in FIG. 3. When the pivot element 123B of the ear hook member 1B rotates between the two resilient walls 316B, the resilient walls 316B will also snap against the opposing surfaces of the pivot element 123B to result in the user feeling a click.

Referring to FIGS. 15 to 19, the third preferred embodiment of a personal audio listening device 100C according to the present invention is shown to include an ear hook member 1C, a housing 2C, and a pivotal knob 3C. The ear hook member 1C is substantially C-shaped, and has a hook body 11C that is configured to be worn on the user's ear, an upper end portion 12C, and a lower end portion 13C. The upper end portion 12C is in the form of a rod which extends in an axial direction that coincides with the direction of the second axis (Y). A distal end of the upper end portion 12C is formed with a polygonal post, preferably a post with an even number of sides, of a certain length. In this embodiment, the post has a square cross section, and serves as the pivot element 123C. A neck portion 125C is formed between the pivot element 123C and the hook body 11C. Assuming that the axial direction of the upper end portion 12C is the lengthwise direction, the size of the neck portion 125C in the widthwise direction and the heightwise direction is smaller than the size of the other parts of the upper end portion 12C.

The housing 2C includes a housing body 21C and a housing cover 23C. The housing body 21C has a surface 212C (close to the user's face in use), which is provided with a circular through hole 213C. In this embodiment, the housing body 21C and the housing cover 23C can be detachably assembled in a known manner. The housing body 21C and the housing cover 23C cooperatively define a hollow portion 221C. For clarity's sake, in FIGS. 16, 18 and 19, the microphone, the speaker, and the necessary circuit device of the personal audio listening device 100C are not illustrated, and the housing cover 23C is omitted as well.

The pivotal knob 3C includes a circular base 31C and a circular cap 35C. The circular base 31C has a base surface 312C, and a surrounding wall 313C extending from a periphery of the base surface 312C. The inner diameter of the surrounding wall 313C is greater than the diameter of the through hole 213C. A heat-fusible portion 311C formed from a heat-fusible plastic material is disposed under the base surface 312C and is extended through the through hole 213C. Preferably, the circular base 31C and the heat-fusible portion 311C are both formed from a heat-fusible plastic material. Two parallel resilient walls 316 extend uprightly from the base surface 312C, and are surrounded by the surrounding wall 313C. Each of the resilient walls 316C has a length slightly greater than that of the pivot element 123C. A distance between the two resilient walls 316C is not smaller than the height or width of the pivot element 123C. Preferably, when the pivot element 123C is received between the two resilient walls 316C, the two resilient walls 316C respectively contact opposing surfaces of the pivot element 123C, and exert a restraining clamping force on the pivot element 123C, and opposing ends of one of the resilient walls 316C are configured to bend toward opposing ends of the other one of the resilient walls 316C. Thus, when the pivot element 123C is received between the resilient walls 316C, the resilient walls 316C embrace the pivot element 123C, thereby helping prevent removal of the ear hook member 1C. The surrounding wall 313C in this embodiment is formed with a slot 315C which is registered with the passage defined by the resilient walls 316C and which is dimensioned to engage fittingly one end of the neck portion 125C of the ear hook member 1C without obstructing rotation of the ear hook member 1C. Two shoulder portions 314C are formed on the inner wall surface of the surrounding wall 313C of the circular base 31C on both sides of the resilient walls 316C, respectively. The cap 35C is in the form of a hat with a round top, and has a surrounding wall 351C. The surrounding wall 351C is provided with two hook portions 358C that are disposed proximate to the bottom edge thereof and that correspond respectively to the shoulder portions 314C in position. The surrounding wall 351C of the cap 35C in this embodiment is formed with only one slot 355C that is registered with the slot 315C. The slot 355C is also dimensioned to engage fittingly said one end of the neck portion 125C of the ear hook member 1C (i.e., both of the slots 315C, 355C engage the same end of the neck portion 125C) without obstructing rotation of the ear hook member 1C. Due to the slot 355C, the cap 35C can be slightly deformed to facilitate fitting of the cap 35C into the circular base 31C. During assembly of the circular base 31C and the cap 35C, the cap 35C is first inserted into the circular base 31C, with the two hook portions 358C respectively engaging the shoulder portions 314C on the inner wall surface of the surrounding wall 313C of the circular base 31C, thereby coupling the circular base 31C and the cap 35C.

In this embodiment, when assembling the ear hook member 1C, the housing 2C, and the pivotal knob 3C, the heat-fusible portion 311C of the circular base 31C of the pivotal knob 3C is extended into the hollow portion 221 through the through hole 213C in the surface of the housing body 21C, and heat is applied to the heat-fusible portion 311C to cause the same to expand into a base disk having a surface area larger than the size of the through hole 213C without adhering to the housing body 21C, so that the circular base 31C can still rotate relative to the housing 2C. Then, the pivot element 123C of the ear hook member 1C is fitted between the resilient walls 316C. Since the length of the resilient walls 316C is slightly greater than that of the pivot element 123C, the resilient walls 316 substantially embrace the pivot element 123C of the ear hook member 1C to help prevent removal of the ear hook member 1C. Then, the cap 35C is put in place, with the slots 355C, 315C engaging the end of the neck portion 125C distal from the pivot element 123C (i.e., the juncture between the neck portion 125C and the hook body 11C) such that the ear hook member 1C cannot be plugged out. The hook portions 358C on the surrounding wall 351C of the cap 35C respectively engage the shoulder portions 314C on the inner wall surface of the surrounding wall 313C of the circular base 31C to couple the circular base 31C and the cap 35C, thereby accomplishing assembly of the ear hook member 1C, the housing 2C, and the pivotal knob 3C.

Similar to the first preferred embodiment, after assembly of the ear hook member 1C, the housing 2C and the pivotal knob 3C, the ear hook member 1C can pivot about the first axis (X) and rotate about the second axis (Y), as shown in FIG. 3. When the pivot element 123C of the ear hook member 1C rotates between the resilient walls 316C, the resilient walls 316C will also snap against the opposing surfaces of the pivot element 123C to generate the feeling of a click.

In sum, when the personal audio listening device of this invention is worn on the user's ear, the ear hook member which is pivotable about the first axis (X) and which is rotatable about the second axis (Y) permits adjustment of the position of a front end of the housing, as well as the position of the microphone (not shown), so as to enable the microphone to be moved closer to the user's mouth. Furthermore, the ear hook member which is rotatable about the second axis (Y) allows the personal audio listening device of the present invention to be worn either on the left ear or the right ear of the user. In addition, when the ear hook member is rotated about the second axis (Y), as illustrated in the above embodiments, the pivot element of the ear hook member is rotatable between the two resilient walls, and when the pivot element is rotated, the resilient walls are gradually pushed away from each other. When the pivot element is rotated through half a step, the two resilient walls are at a largest stretched position. After the pivot element has completed one step of rotation, the stretched resilient walls will be restored to their original positions, and will snap against the opposing surfaces of the pivot element, whereupon the user will feel a click that lets the user know that the pivot element has been rotated through a step. Subsequent rotation of the pivot element will cause the pivot element to go through further steps of rotation in the aforementioned manner.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A personal audio listening device adapted to be worn on a user's ear, comprising:
a housing having a surface and a hollow portion, and defining a first axis and a second axis;
a pivotal knob pivotably mounted on said surface of said housing, said pivotal knob including a pair of parallel resilient walls; and
an ear hook member including a hook body and an end portion, said end portion including a pivot element in the form of a polygonal post, said hook body being configured to be worn on the user's ear, said pivot element being received fittingly between said resilient walls to thereby enable said ear hook member to be mounted on said pivotal knob, said ear hook member being pivotable about said first axis and being rotatable about said second axis.

2. The personal audio listening device according to claim 1, wherein, prior to rotation of said pivot element, two opposing sides of said polygonal post abut against opposite wall surfaces of said resilient walls, respectively, and when said pivot element is rotated, said polygonal post pushes said resilient walls gradually away from each other until said resilient walls are pushed apart to a widest stretched position by two diagonally opposite corners of said polygonal post, said resilient walls snapping against said opposing surfaces of said pivot element upon restoration of said resilient walls to original positions to thereby generate the feeling of a click.

3. The personal audio listening device according to claim 1, wherein said pivot element is a post having an even number of sides.

4. The personal audio listening device according to claim 1, wherein said pivot element is formed on said end portion of said ear hook member proximate to a distal end thereof, and has a cross-sectional size smaller than that of the remainder of said end portion, each of said resilient walls having lengthwise opposing ends each of which abuts against a juncture between said pivot element and the remainder of said end portion.

5. The personal audio listening device according to claim 1, wherein said pivot element is formed at a distal end of said end portion, a neck portion being interposed between said pivot element and said hook body, said pivotal knob abutting against a juncture between said neck portion and said hook body.

6. The personal audio listening device according to claim 5, wherein opposite ends of one of said resilient walls are configured to bend toward opposite ends of the other of said resilient walls such that when said pivot element is received between said resilient walls, said resilient walls embrace said pivot element.

7. The personal audio listening device according to Claim 1, wherein said housing includes a through hole extending through said surface and in spatial communication with said hollow portion, said pivotal knob including a base and a cap, said base including a plurality of engaging walls disposed at an outer periphery thereof, hooks formed respectively at free ends of said engaging walls, and said resilient walls disposed between said engaging walls, said cap including a circular surrounding wall, two flanges extending along said circular surrounding wall, spaced apart from each other, and having a diameter greater than that of said through hole, a pair of slots formed in said circular surrounding wall, and a plurality of ribs formed on an inner wall surface of said circular surrounding wall and corresponding respectively to said hooks, wherein said base is extended through said through hole from said hollow portion, and each of said hooks engages a corresponding one of said ribs such that said pivotal knob is rotatably coupled to said housing.

8. The personal audio listening device according to claim 1, wherein said housing includes a through hole extending through said surface and in spatial communication with said hollow portion, said pivotal knob including a base and a cap, said base including a plurality of engaging walls disposed at an outer periphery thereof, hooks formed respectively at free ends of said engaging walls, and said resilient walls disposed between said engaging walls, said cap including an annular bottom wall, a circular surrounding wall extending integrally and upwardly from said bottom wall, a pair of fitting holes provided in said circular surrounding wall, and a plurality of ribs formed on an inner wall surface of said circular surrounding wall and corresponding respectively to said hooks, said circular surrounding wall of said cap being extended outwardly through said through hole from said hollow portion such that said annular bottom wall is blocked by said housing, said end portion of said ear hook member being extended through said fitting holes, said base being inserted into said cap, said hooks respectively engaging said ribs such that said housing and said pivotal knob are rotatably coupled.

9. The personal audio listening device according to claim 1, wherein said housing includes a through hole extending through said surface and in spatial communication with said hollow portion, said pivotal knob including a circular base and a circular cap, said circular base including a surrounding wall, a heat-fusible portion disposed under said base, extended through said through hole, and formed from a heat-fusible plastic material, a slot formed in said surrounding wall, a plurality of shoulder portions formed on said surrounding wall, and said resilient walls, said cap including a circular surrounding wall, a plurality of hook portions formed on said circular surrounding wall of said cap and corresponding respectively to said shoulder portions, and a slot formed in said circular surrounding wall of said cap and corresponding to said slot formed in said surrounding wall of said circular base, said heat-fusible portion being subjected to heat treatment after being extended into said hollow portion through said through hole to form said heat-fusible portion into a base disk, said hook portions of said cap respectively engaging said shoulder portions such that said housing and said pivotal knob are rotatably coupled.

10. The personal audio listening device according to claim 1, wherein said first axis is substantially perpendicular to said second axis, said first axis being substantially perpendicular to a plane defined by a profile of the user's ear, said second axis being substantially disposed in said plane.

11. The personal audio listening device according to claim 1, wherein said personal audio listening device is a Bluetooth earphone.

* * * * *